Jan. 10, 1956     W. F. BUTLER     2,730,098
DRIP METER
Filed Oct. 19, 1953
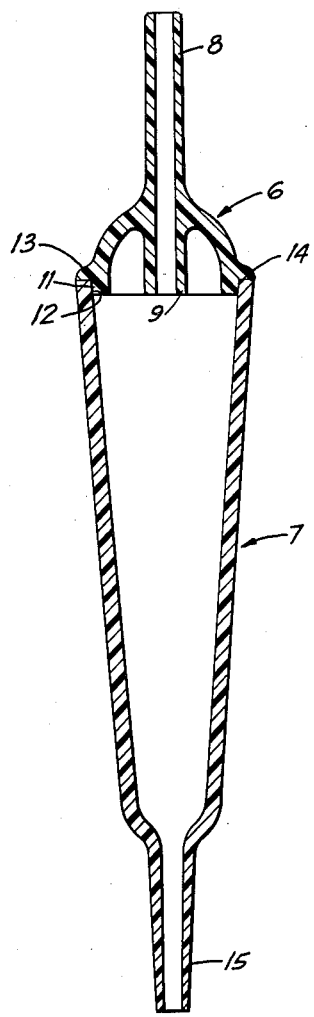
INVENTOR.
WILLIAM F. BUTLER
BY ECKHOFF & SLICK
ATTORNEYS

United States Patent Office 2,730,098
Patented Jan. 10, 1956

2,730,098

DRIP METER

William F. Butler, Oakland, Calif., assignor to Cutter Laboratories, Inc., a corporation of California Application October 19, 1953, Serial No. 387,007

1 Claim. (Cl. 128—214)

This invention relates to an improved drip meter, useful to measure the rate of a liquid during an intravenous injection.

Drip meters as used heretofore have generally been made up of cylindrical vessels having an inlet and an outlet at each end, the fluid being admitted through the inlet to the upper end of the vessel and dropping to the outlet; the rate of flow of the liquid is ascertained from the number of drops per minute. The falling of the drops results in an intermittent feed through the outlet from the meter, with possible hazard of air entrainment.

It is in general the broad object of the present invention to provide an improved drip meter, one which enables a connection to be established readily with the container for the liquid to be injected and which enables the rate of flow of the liquid to be measured accurately as the liquid is fed, drop by drop. The drip meter of this invention is further characterized in that the dropping of the fluid during metering is cushioned and is not transmitted to the liquid stream injected into the patient. Additionally, the drip meter of the present invention is characterized in that its construction obviates air entrainment in the liquid fed to the patient.

The invention includes other objects and features, some of which, together with the foregoing, will appear hereinafter, when the present preferred form of the drip meter is disclosed. In the drawing accompanying and forming a part hereof, the single figure is a section taken through a drip meter embodying the present invention.

The drip meter depicted comprises a cover generally indicated at 6 and a body portion generally indicated at 7, the two being suitably joined together. The cover includes a spike end 8 which is suited for insertion into the closure in a bottle of liquid to be fed intravenously. This spike extends through the cover 6 to an outlet 9, this being provided centrally of the cover and in a spaced relation to the body 7. The cover 6 includes a depending flange 11 which fits closely adjacent to the side wall 12 of the body 7 while radial flange 13 is adapted to rest upon the upper end of 14 of the body 7.

In accordance with this invention, the body 7 is made in the form of a cone, the cover being affixed to the base of the cone while a fluid outlet 15 is provided at the apex of the cone. With the cover 6 and the conical body 7 suitably joined together, fluid entering spike 8 is released from the outlet 9 and falls into the conical body 7. Because this tapers toward its outlet 15, the fluid that collects in the bottom portion thereof provides a cushion, thus preventing the dropping of the fluid from providing an intermittent liquid feed to the patient. Further, since the fluid fed to the patient is taken from the collected liquid body in the bottom portion of the conical body 7, air entrainment is obviated.

The cover 6 and body 7 can be made of any suitable plastic material such as styrene or polyethylene; it is preferred that a clear, transparent plastic be utilized so that the feed of liquid can be clearly discerned. The conical shape of body 7 also enables the device to be manipulated with assuredness inasmuch as the conical body can be readily grasped firmly in the fingers and a thrusting force applied to force the spike to enter into the liquid container closure.

The included angle between the outer sidewalls of the cone should be relatively small; that is, generally less than 25°, preferably of the order of 8° and more than about 5°, so that a relatively long, conical body is provided which can be readily grasped in the hand and which provides adequate space in which the liquid can collect prior to release through the outlet 15.

I claim:

A leak-proof, unitary drip meter consisting of an elongated, transparent, hollow body; said body consisting of a cone and a cover therefor; said cone having a base, an apex and a sidewall disposed symmetrically about the longitudinal axis of the cone; the sidewall of the cone having an included angle between about 5° and about 25°; said cone terminating in an extended tubular portion symmetrically disposed about the longitudinal axis of the cone and providing an outlet from the cone at the apex end of the cone; said outlet being of relatively small cross-section as compared to the cross-section of the cone to provide a liquid trap at the apex end of the cone and maintain a body of liquid above said outlet to cushion the fall of fluid in the cone; said liquid body being of diminishing cross-sectional area as measured in successive planes normal to said axis and at successively lower elevations toward said outlet; said cone tapering gradually from said base to said outlet to provide the cone with exterior and interior surfaces tapering everywhere inwardly toward (a) the longitudinal axis of the cone and (b) said outlet on said cone; said cover being secured over the base of the cone and having an integral tubular member symmetrically disposed about the longitudinal axis of the cover and extending beyond the cover on each side thereof to provide a liquid inlet to the cone on the outside of the cover and a liquid discharge orifice off which liquid drips and falls unimpeded through the cone into the body of liquid trapped temporarily at the apex end of the cone; said cover tapering gradually inwardly toward the tubular member to provide the cover with exterior and interior surfaces tapering inwardly toward the longitudinal axis of the cover and the liquid inlet in the tubular member; said cover being secured integrally and permanently on the base so that the cover and base are integral, one with the other, and the hollow body so provided is unitary and leak-proof.

References Cited in the file of this patent

UNITED STATES PATENTS

| 2,644,586 | Cutter | July 7, 1953 |
| 2,660,167 | Polacco | Nov. 24, 1953 |
| 2,696,818 | Van Loghem | Dec. 14, 1954 |